(12) United States Patent
Adachi

(10) Patent No.: US 6,727,944 B1
(45) Date of Patent: Apr. 27, 2004

(54) DIGITAL ELECTRONIC STILL-VIDEO CAMERA AND METHOD OF CONTROLLING OPERATION OF SAME

(75) Inventor: Kaoru Adachi, Asaka (JP)

(73) Assignee: Fuji Photo Film Co., LTD, Kanagawa (JP)

( * ) Notice: Subject to any disclaimer, the term of this patent is extended or adjusted under 35 U.S.C. 154(b) by 0 days.

(21) Appl. No.: 09/258,423

(22) Filed: Feb. 26, 1999

(30) Foreign Application Priority Data

Mar. 2, 1998 (JP) .......................................... 10-066244

(51) Int. Cl.⁷ ................................................ H04N 5/76
(52) U.S. Cl. ................. 348/231.99; 348/231.9
(58) Field of Search ........................... 348/231.8, 231.1, 348/231.7, 231.9, 231.99; 386/117; 358/906, 404

(56) References Cited

U.S. PATENT DOCUMENTS 5,153,730 A * 10/1992 Nagasaki et al. ........ 348/231.6
5,986,700 A * 11/1999 Wakui ..................... 348/231.8

* cited by examiner

*Primary Examiner*—Andrew Christensen
*Assistant Examiner*—Tia M. Harris
(74) *Attorney, Agent, or Firm*—Birch, Stewart, Kolasch & Birch, LLP

(57) ABSTRACT

Consumption of power in a digital electronic still-video camera is reduced. Specifically, a digital electronic still-video camera includes a first memory module circuit and a second memory module circuit controlled by a memory module circuit so as to be placed in active and standby states. When one memory module circuit is in the active state, the other memory module circuit is placed in the standby state, thereby making it possible to reduce power consumption.

10 Claims, 10 Drawing Sheets

DIGITAL ELECTRONIC STILL-VIDEO CAMERA AND METHOD OF CONTROLLING OPERATION OF SAME

BACKGROUND OF THE INVENTION

FIELD OF THE INVENTION

This invention relates to a digital electronic still-video camera for picking up the image of a subject and recording image data representing the image of the subject on a recording medium, and to a method of controlling the operation of this camera.

In a digital electronic still-video camera, image data obtained by picking up the image of a subject is stored temporarily in an internal image memory, the image data is read out of the image memory and is then subjected to various signal processing such as processing for generating a luminance signal, processing for generating color difference signals and processing for compression and decompression of data.

A plurality of image memories having prescribed storage capacities are connected in parallel with a circuit that executes various signal processing. If the image data becomes large in quantity, the number of image memories also increases. If a large number of image memories are used, the address lines and data lines connected to these memories also become large in number and the amount of power necessary to drive the address and data lines increases as well.

If the amount of image data increases, moreover, so does the amount of signal processing. In order to shorten the time required for various signal processing, it is necessary to raise the speed at which data is accessed. However, increasing the data access speed increases the amount of power consumption as well.

SUMMARY OF THE INVENTION

Accordingly, an object of the present invention is to provide a digital electronic still-video camera and a method of controlling the operation thereof in which it is possible to reduce the amount of power consumption.

According to the present invention, the foregoing object is attained by providing a digital electronic still-video camera for obtaining image data representing the image of a subject by picking up the image of the subject using image sensing means, and recording the obtained image data on a recording medium, comprising: a plurality of memory modules each of which includes an image memory to and from which image data can be written and read, and an image memory control circuit responsive to an applied standby/active control signal for placing the image memory in a standby or active state and controlling the image memory in such a manner that when the image memory has been placed in the active state, image data obtained from the image sensing means is written to the image memory or image data that has been written to the image memory is read out of the image memory; and a memory module control circuit for applying the standby/active control signal to the image memory control circuits included in the plurality of memory modules.

The present invention further provides an operation control method suited to the camera described above. Specifically, the present invention provides a method of controlling operation of a digital electronic still-video camera for obtaining image data representing the image of a subject by picking up the image of the subject using image sensing means, and recording the obtained image data on a recording medium, comprising the steps of: providing a plurality of memory modules each of which includes an image memory to and from which image data can be written and read, and an image memory control circuit responsive to an applied standby/active control signal for placing the image memory in a standby or active state and controlling the image memory in such a manner that when the image memory has been placed in the active state, image data obtained from the image sensing means is written to the image memory or image data that has been written to the image memory is read out of the image memory; and applying the standby/active control signal to the image memory control circuits included in the plurality of memory modules.

In accordance with the present invention, the standby/active control signal is output by the memory module control circuit and applied to the image memory control circuit. The image memory is controlled so as be placed in the standby or active state in dependence upon the standby/active control signal that has entered the image memory control circuit.

When the image memory has been placed in the active state, image data obtained by image pick-up is written to the memory or image data that has been written to the memory is read out.

In accordance with the present invention, the image memories included in the plurality of memory modules can be controlled so as to be placed in the standby or active state. Since image memories not necessarily required for various signal processing can be placed in the standby state, power consumption can be reduced.

By way of example, the memory module control circuit applies the standby/active control signal to the image memory control circuit in such a manner that when the image memory included in one memory module among the plurality of memory modules is in the active state, the image memory included in at least one memory module among the other memory modules is placed in the standby state.

The plurality of memory modules may be freely attachable to and detachable from the image sensing means.

When the image sensing means and the image memories included in the plurality of memory modules are connected via a common bus, the image memory control circuits included in the plurality of memory modules each output a signal indicative of a bus-use request to the memory module control circuit. The memory module control circuit includes decision means (a decision device) for deciding, on the basis of the bus-use request signals input thereto, the image memory control circuit that is allowed to use the bus, and enabling signal output means (an enabling signal output device) for outputting a bus-use enabling signal to the image memory control circuit allowed to use the bus by the decision means.

Since the memory control circuit allowed to use the bus is capable using the bus, data collision can prevented even though the bus is a common bus.

Preferably, the memory module control circuit selects an image memory, to which image data obtained by the image sensing means is written, in dependence upon the storage capacities of the image memories included in the plurality of memory modules.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
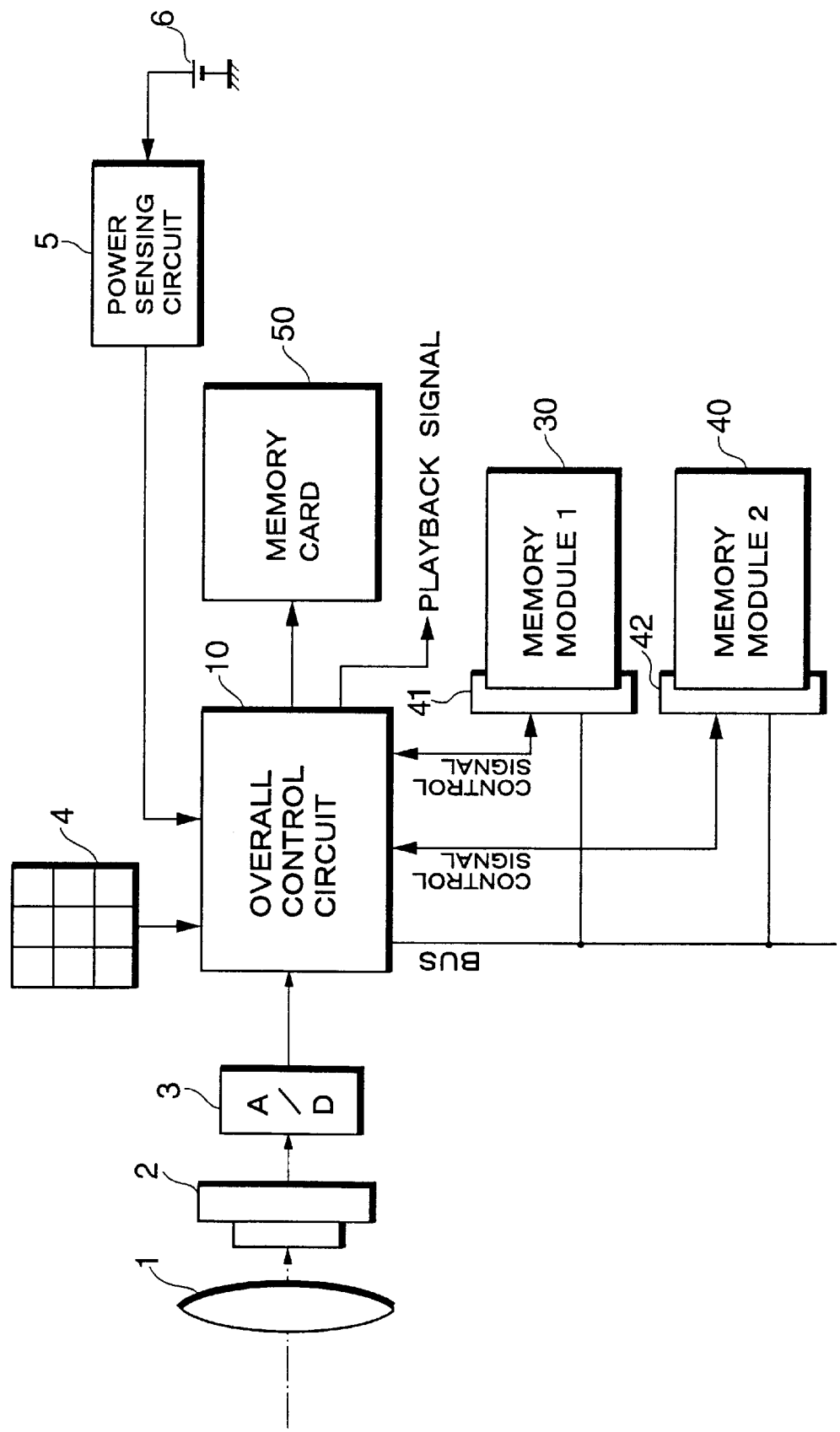
FIG. 1 is a block diagram illustrating the overall construction of a digital electronic still-video camera.

FIG. 1 is a block diagram illustrating the electrical configuration of a digital electronic still-video camera embodying the present invention.

The overall operation of the digital electronic still-video camera is supervised by an overall control circuit 10.

A lithium battery 6 for supplying operating power is placed in the digital electronic still-video camera. When the lithium battery 6 is inserted into the camera, this is sensed by a power sensing circuit 5. A signal indicating that placement of the battery has been sensed enters the overall control circuit 10. The digital electronic still-video camera is provided with a keypad 4 for setting various modes such as a recording mode, playback mode and movie playback mode. A signal representing the setting made by the keypad 4 is input to the overall control circuit 10.

The digital electronic still-video camera is provided with two memory module circuits 30 and 40 each of which contains an image memory to and from which image data can be written and read. The memory module circuits 30 and 40 are connected to the overall control circuit 10 by a bus and are capable of being removably attached to the digital electronic still-video camera via connectors 41 and 42, respectively.

The image of a subject is formed on the light-receiving surface of a CCD 2 by an image pick-up lens 1. The image signal representing the image of the subject is output from the CCD 2 and is converted to digital image data by an analog/digital converter circuit 3. The digital image data enters the overall control circuit 10.

Under the control of the overall control circuit 10, the digital image data is written to the image memory contained in the memory module circuit 30 or memory module circuit 40 or to the image memories contained in both of these memory module circuits 30 and 40. The image data is subjected to processing, such as processing for generating luminance data, processing for generating color difference data and processing for compression and decompression, in one or both of the memory module circuits 30, 40. The operation of the overall control circuit 10 and of the memory module circuits 30 and 40 will be described later in greater detail.

The image data that has been written to one or both of the memory module circuits 30, 40 is read out and recorded on a memory card 50 under the control of the overall control circuit 10.

Figure 2:
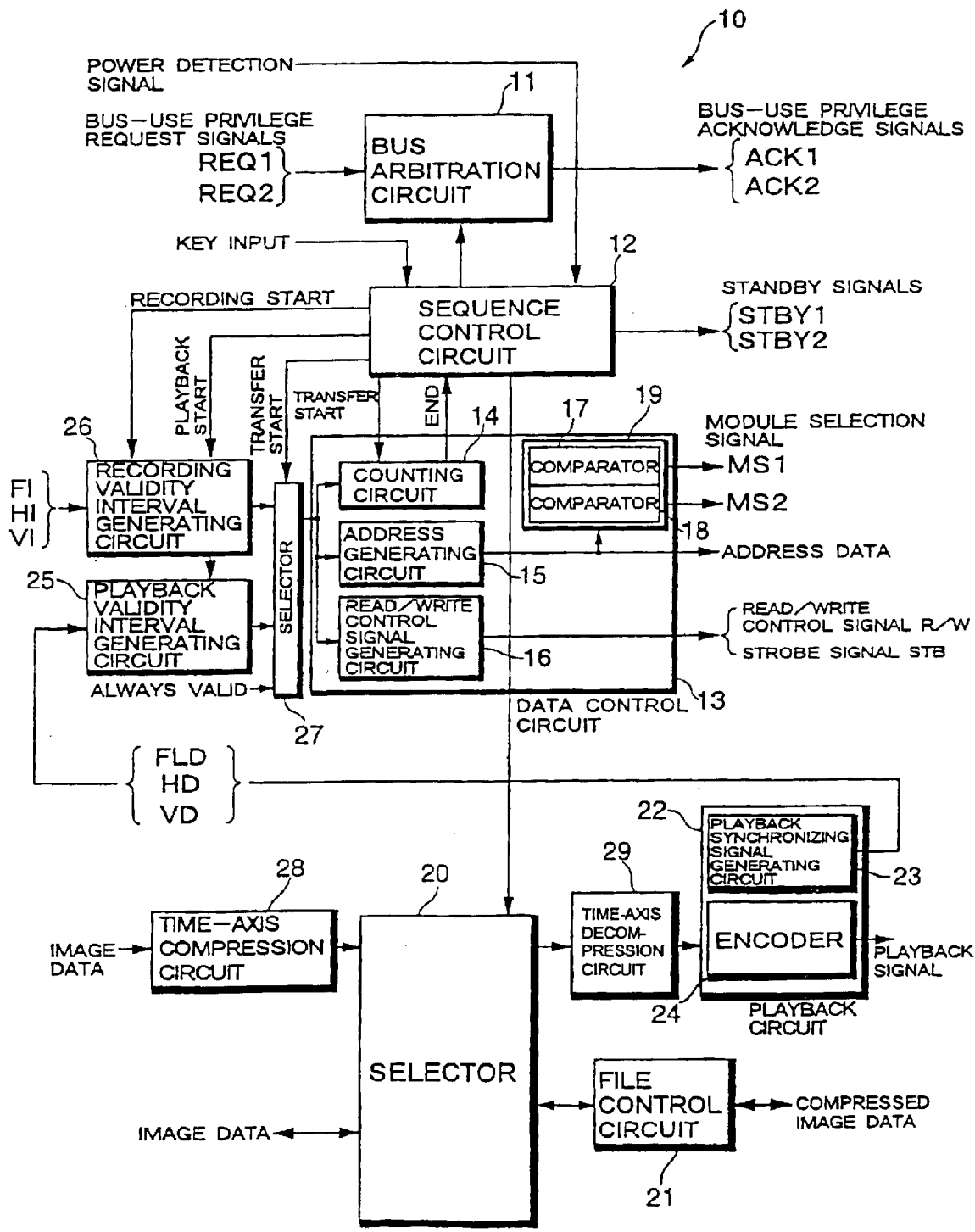
FIG. 2 is a block diagram illustrating the electrical configuration of an overall control circuit.

FIG. 2 is a block diagram showing the construction of the overall control circuit 10.

The overall control circuit 10 has its overall operation supervised by a sequence control circuit 12.

The image data output by the analog/digital converter circuit 3 enters a selector 20 via a time-axis compression circuit 28. The output of the image data that has entered the selector 20 is controlled by the sequence control circuit 12 so as to be applied to a playback circuit 22 via a time-axis decompression circuit 29, to a file control circuit 21 or to the memory module 30 or 40.

As will be described later, the time-axis compression circuit 28 and the time-axis decompression circuit 29 merely allow the image data to pass in a case where the image data is recorded on the memory card 50 and in a case where image data that has been recorded on the memory card 50 is reproduced. In the case of a movie playback mode, the image data is compressed along the time axis by the time-axis compression circuit 28 and the original axis of the image data is restored by the time-axis decompression circuit 29, as will be described later.

Bus-use privilege request signals REQ1, REQ2 output by the memory module circuits 30 and 40 enter a bus arbitration circuit 11, which outputs acknowledge signals ACK1 and ACK2 for enabling bus-use privilege to the memory module circuit 30 or 40.

The overall control circuit 10 includes a recording validity interval generating circuit 26. The latter outputs a recording validity interval signal for extracting, from the image data that has entered the overall control circuit 10 from the analog/digital converter circuit 3, the part of the image data that is to be recorded on the memory card 50. A signal FI which identifies the field of the image data output by the CCD 2, a horizontal synchronizing signal HI of the CCD 2 and a vertical synchronizing signal VI of the CCD 2 enter the recording validity interval generating circuit 26. (These signals are generated by a timing generator, which is not shown.) The recording validity interval generating circuit 26 uses these signals to generate a recording validity interval signal.

A playback validity interval generating circuit 25 outputs a playback validity interval signal for extracting, from the playback signal output by the overall control circuit 10, a signal used as a playback signal. Input to the playback validity interval generating circuit 25 are an identification signal FLD that indicates whether the playback signal output by a playback synchronizing signal generating circuit 23 included in the playback circuit 22 is an odd-numbered field or an even-numbered field, as well as a vertical synchronizing signal VD and a horizontal synchronizing signal HD regarding the playback signal. On the basis of the signals FLD, VD and HD input thereto, the playback validity interval generating circuit 25 generates a signal indicating a playback validity interval.

The validity interval signals output by the recording validity interval generating circuit 26 and playback validity interval generating circuit 25 are both applied to a selector 27. Also input to the selector 27 is a signal that is always indicative of validity. This signal is used when image data that has been recorded on the memory card 50 is reproduced.

A data control circuit 13 generates various signals and data used to write image data to the memory module circuit 30 or 40 or to read out image data that has been written to the memory module circuit 30 or 40.

The data control circuit 13 includes a counting circuit 14 for measuring the quantity of image data, an address generating circuit 15 for generating address data that designates an address of the image memory contained in the memory module circuit 30 or 40, a read/write control signal generating circuit 16 which outputs a read/write control signal R/W for specifying whether image data is to be written to the image memory or image data that has been written to the image memory is to be read out, and a strobe signal STB for stipulating read/write timing, and a module selection circuit 19 which outputs module selection signals MS1, MS2 for selecting the memory module circuit 30 or 40. The module selection circuit 19 includes a first comparator 17 and a second comparator 18. The comparators 17 and 18 have been set to an address threshold value. The address generated in the address generating circuit 15 is input to the comparators 17 and 18. If the input address is greater than the threshold value, the module selection signal MS1 for selecting the memory module circuit 30 is output. If the input address is less than the threshold value, the module selection signal MS1 for selecting the memory module circuit 40 is output.

The storage capacities of the image memories contained in the memory module circuits 30 and 40 loaded in the digital electronic still-video camera have been set in the sequence control circuit 12. The data control circuit 13 (or, more precisely, the address generating circuit 15) is controlled in such a manner that image data obtained by image pick-up is written to the image memory contained in the memory module circuit 30 or 40 based upon the capacities of these image memories.

The playback circuit 22 includes an encoder 24 in addition to the above-mentioned playback synchronizing signal generating circuit 23. The encoder 24 converts image data to a playback signal having a form suited to a display device (not shown).

The overall control circuit 10 is provided with the time-axis compression circuit 28 for compressing the image data along the time axis and the time-axis decompression circuit 29 for decompressing the image data along the time axis, as mentioned above. In movie playback, image data output by the analog/digital converter circuit 3 is compressed along the time axis and the image data thus compressed is input from the overall control circuit 10 to the memory module circuit 30 or 40, as will be described later. When the image data compressed along the time axis is read out of the memory module circuit 30 or 40, it is decompressed along the time axis by the time-axis decompression circuit 29, whereby the time axis that prevailed at the time of image pick-up is restored.

Figure 3:
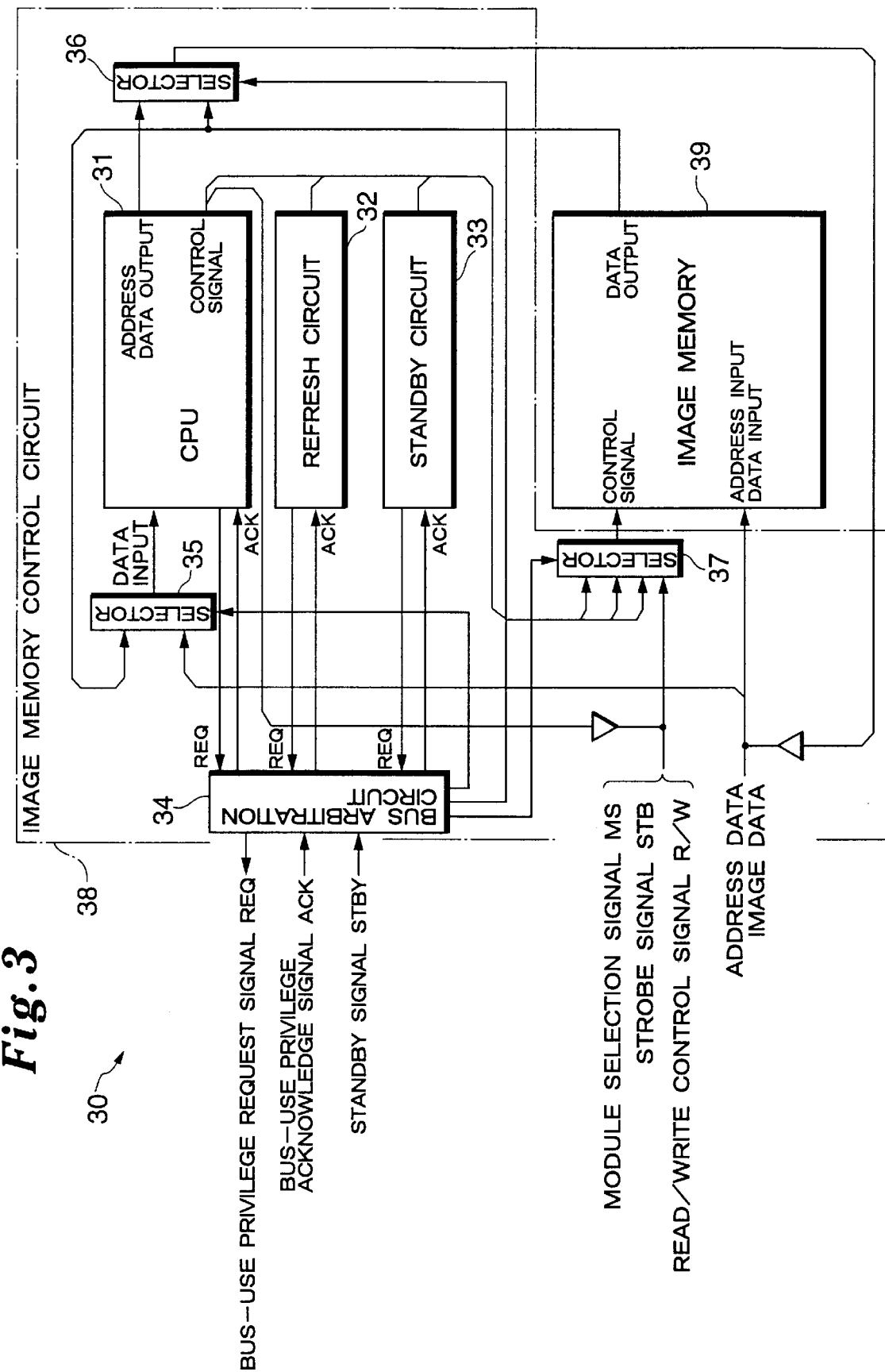
FIG. 3 is a block diagram showing the electrical configuration of a memory module circuit.

FIG. 3 is a block diagram showing the electrical configuration of the memory module circuit 30. Since the memory module circuit 30 and the memory module circuit 40 are identical in construction, only the memory module circuit 30 will be described.

The memory module circuit 30 comprises an image memory control circuit 38 and an image memory 39. The image memory control circuit 38 controls the writing of image data to the image memory 39 and the reading of image data from the image memory 39.

The image memory control circuit 38 includes a CPU 31, which supervises the overall operation of the memory module circuit 30. The CPU 31 functions to read image data that has been written to the image memory 39, to compress and decompress image data and to execute processing for generating a luminance signal and color difference signals.

A bus-use privilege acknowledge signal ACK and a standby signal STBY enter a bus arbitration circuit 34 included in the image memory control circuit 38. Selectors 35, 36 and 37 are controlled based upon the bus-use privilege acknowledge signal ACK to limit image data input to the CPU 31, image data input to the image memory 39 and a control signal input to the image memory 39. A refresh circuit 32 refreshes, at fixed time intervals, image data that is stored in the image memory 39. According to this embodiment, a DRAM is used for the image memory 39 and the stored image data is refreshed at fixed time intervals. A standby circuit 33 performs control so as to place the image memory 39 in the standby state.

Figure 4:
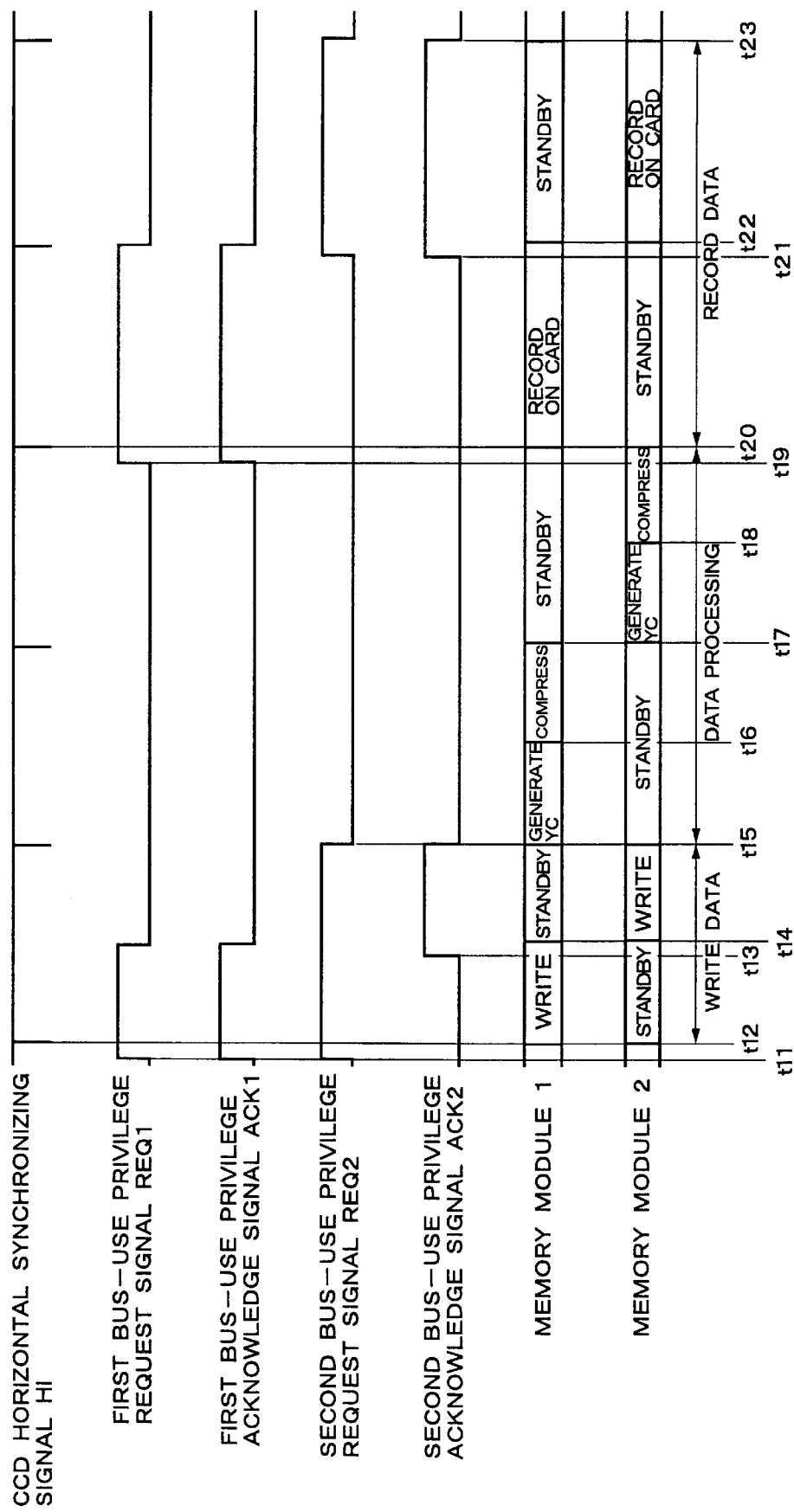
FIGS. 4 to 7 and FIGS. 8a and 8b are time charts illustrating signals that flow into each circuit of the digital electronic still-video camera as well as the states of memory module circuits.
Figure 5:
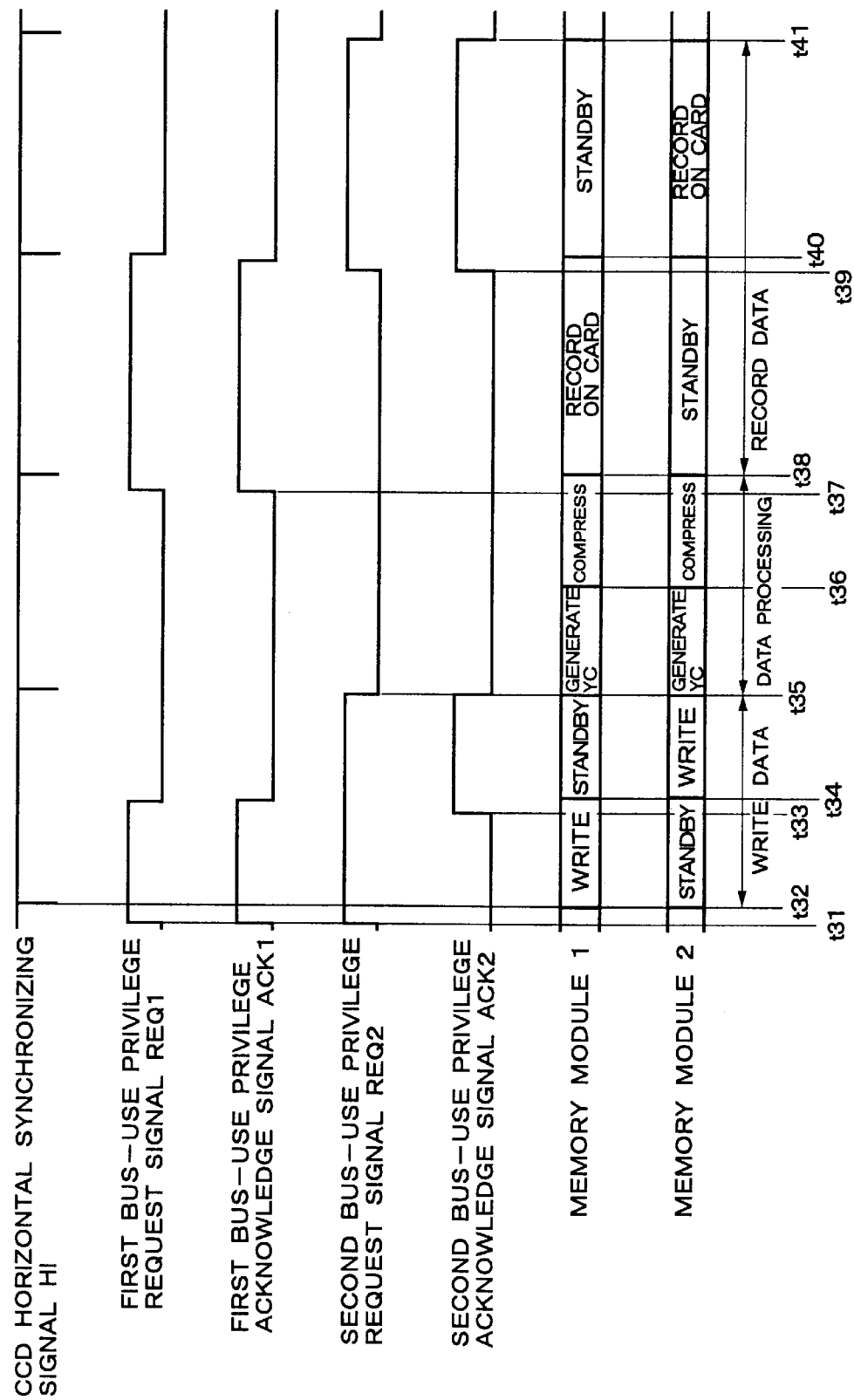

FIGS. 4 and 5 are time charts illustrating signals that flow into each circuit of the digital electronic still-video camera as well as the operating states of the memory module circuits when image data is recorded on the memory card 50. FIG. 4 shows an operation time chart when higher priority is given to reduction of power consumption than to time needed to finish the writing of data to the memory card 50. FIG. 5 shows an operation time chart when higher priority is given to time needed to finish the writing of data to the memory card 50 than to reduction of power consumption.

With reference primarily to FIGS. 2, 3 and 4, the first bus-use privilege request signal REQ1 is output by the image memory control circuit 38 of the first memory module circuit 30 and the second bus-use privilege request signal REQ2 is output by the image memory control circuit of the second memory module circuit 40 at time t11.

The first bus-use privilege request signal REQ1 output by the first memory module circuit 30 and the second bus-use privilege request signal REQ2 output by the second memory module circuit 40 enter the bus arbitration circuit 11 of the overall control circuit 10. The bus arbitration circuit 11 outputs the bus-use privilege acknowledge signal ACK which represents the memory module circuit that is capable of using the bus. Here the first memory module circuit 30 is allowed to use the bus first. At time t11, therefore, the first bus-use privilege acknowledge signal ACK1 enters the bus arbitration circuit 34 of the first memory module circuit 30 from the bus arbitration circuit 11. The first bus-use privilege acknowledge signal ACK1 is input to the CPU 31.

Image data obtained by image pick-up is input to the first memory module circuit 30 from the overall control circuit 10 and the image data is written to the first image memory 39 from time t12 to time t14 based upon the validity signal output by the recording validity interval generating circuit 26. A standby signal STBY2 output by the sequence control circuit 12 enters the second memory module circuit 40 from time t12 to time t14. The image memory of the second memory module circuit 40 is placed in the standby state by the standby circuit 33. This makes it possible to suppress the power consumed by the image memory of the second memory module circuit 40.

When time t13 arrives, the second bus-use privilege acknowledge signal ACK2 is output and image data obtained by image pick-up is input and written to the image memory of the second memory module circuit 40. The writing of the image data continues from time t14 to time t15. During the time t14 to t15 that the image data is being written to the image memory of the memory module circuit 40, a standby signal STBY1 is applied to the first memory module circuit 30 and the first image memory 39 is placed in the standby state by the standby circuit 33 included in the first memory module circuit 30. As a result, power consumed by the image memory can be reduced.

When time t15 arrives, the image data that has been written to the first image memory 39 of the first memory module circuit 30 is read out by the CPU 31 and is input to the CPU 31 via the selector 35, which proceeds to execute processing for generating luminance data and color difference data. When time t16 arrives, the processing for generating the luminance data and color difference data ends and data compression is executed by the CPU 31 in regard to the luminance data and color difference data generated. The data compression ends when time t17 arrives. The compressed luminance data and color difference data is input and written to the image memory 39 via the selector 36.

The image memory contained in the second memory module circuit 40 is placed in the standby state from time t15 to t17 during which the CPU 31 of the first memory module circuit 30 is executing the processing for generating the luminance data and color difference data and the processing for data compression.

When time t17 arrives, the image memory contained in the first memory module circuit 30 is placed in the standby state until time t20. From time t17 to time t20, now the CPU of the second memory module circuit 40 subjects the image data that has been written to the image memory to processing for generating luminance data, processing for generating color difference data and processing for data compression.

The first memory module circuit 30 outputs the first bus-use privilege request signal REQ1 at a time t19 slightly earlier than the time t20. When the first bus-use privilege request signal REQ1 enters the bus arbitration circuit 11 of the overall control circuit 10, the bus arbitration circuit 11 outputs the bus-use privilege acknowledge signal ACK1, which enters the first memory module circuit 30. The entry of the bus-use privilege acknowledge signal ACK1 to the memory module circuit 30 is accompanied by read-out of compressed luminance data and compressed color difference data that has been written to the first image memory 39. This data is output to the overall control circuit 10 via the selector 36.

The compressed luminance data and compressed color difference data input to the overall control circuit 10 enters the file control circuit 21 via the selector 20. The compressed luminance data and compressed color difference data is recorded in a prescribed recording area of the memory card 50 by the file control circuit 21.

The image memory of the second memory module circuit 40 is placed in the standby state from time t20 to time t21 during which the compressed luminance data and compressed color difference data read out of the first memory module circuit 30 is being recorded on the memory card 50.

When the compressed luminance data and compressed color difference data read out of the first memory module circuit 30 is finished being recorded on the memory card 50 at time t21, the compressed luminance data and compressed color difference data is read out of the second memory module circuit 40 and recorded on the memory card 50 from time t22 to time t23. The image memory of the first memory module circuit 30 is placed in the standby state while the compressed luminance data and compressed color difference data read out of the second memory module circuit 40 is being recorded on the memory card 50.

Thus, when processing is being executed in regard to image data that has been input to the first memory module circuit 30, the image memory contained in the second memory module circuit 40 is placed in the standby state. When processing is being executed in regard to image data that has been input to the second memory module circuit 40, the image memory 39 contained in the first memory module circuit 30 is placed in the standby state. A reduction in power consumption can be achieved because the image memory 39 contained in the first memory module circuit 30 and the image memory contained in the second memory module circuit 40 are not both placed in the active state at all times.

With reference now to FIG. 5, in which higher priority is given to time needed to finish the writing of compressed luminance data and compressed color difference data to the memory card 50 than to reduction of power consumption, processing for generating luminance data, processing for generating color difference data and processing for compressing data executed by the CPU 31 of the first memory module circuit 30 is performed at the same time as processing for generating luminance data, processing for generating color difference data and processing for compressing data executed by the CPU of the second memory module circuit 40 (from time t35 to time t38). As a result, the time needed to complete the recording of data on the memory card 50 can be shortened.

Figure 6:
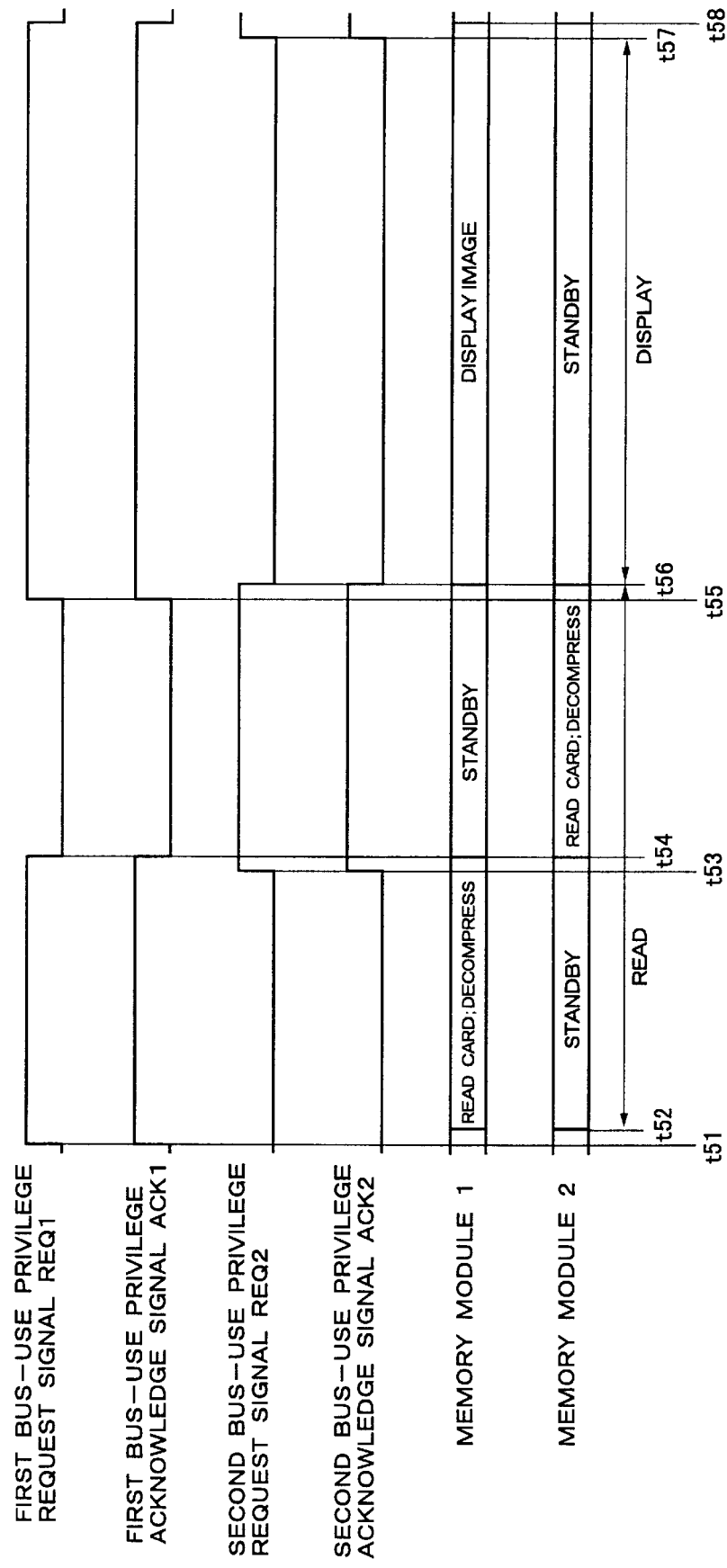
Figure 7:
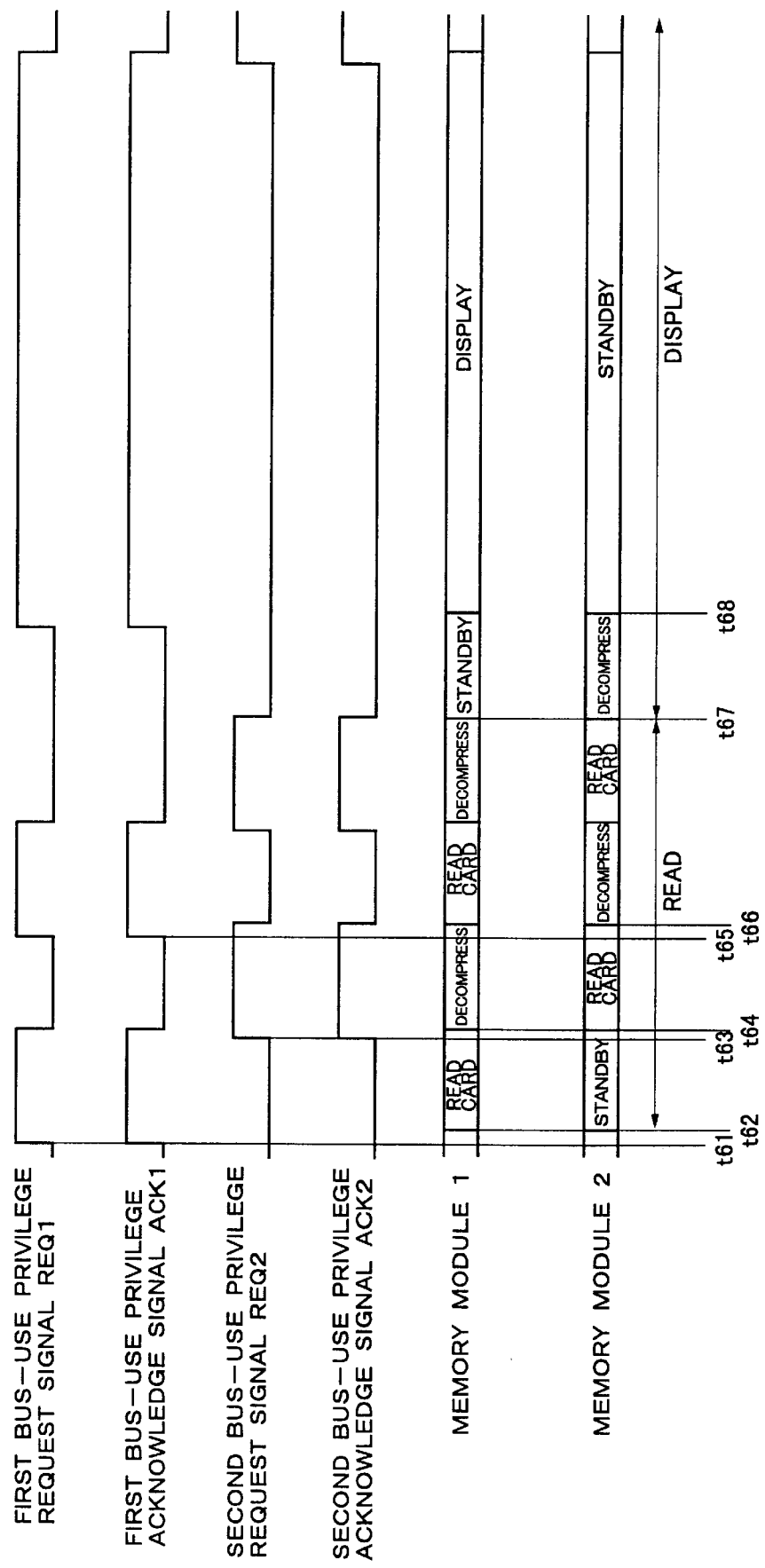

FIGS. 6 and 7 are time charts illustrating signals that flow into each circuit of the digital electronic still-video camera as well as the operating states of the memory module circuits when compressed luminance data and compressed color difference data (these items of data shall be referred to as "compressed image data") that has been stored on the memory card 50 is reproduced. FIG. 6 shows an operation time chart when higher priority is given to reduction of power consumption than to time needed to start display of the image represented by the compressed image data that has been recorded on the memory card. FIG. 7 shows an operation time chart when higher priority is given to time needed to start display of the image represented by the compressed image data that has been recorded on the memory card than to reduction of power consumption.

With reference primarily to FIGS. 2, 3 and 6, the first bus-use privilege request signal REQ1 is output by the CPU 31 of the first memory module circuit 30 and enters the bus arbitration circuit 11 of the overall control circuit 10. When the bus arbitration circuit 11 allows use of the bus by the CPU 31 of the first memory module circuit 30, the bus arbitration circuit 11 of the overall control circuit 10 outputs the first bus-use privilege acknowledge signal ACK1, which enters the CPU 31 of the first memory module circuit 30. When time t52 arrives, the compressed image data that has been recorded on the memory card 50 is reproduced under the control of the file control circuit 21 of the overall control circuit 10 and is input and written to the first image memory 39 of the first memory module circuit 30 from the overall control circuit 10. The compressed image data thus written is read out of the first image memory 39 and input to the CPU 31. The compressed image data is decompressed by the CPU 31 and the decompressed image data is written to the image memory 39.

When time t54 arrives, the reproduction from the memory card 50 of the compressed image data in the first memory module circuit 30 and the processing for decompressing the compressed image data end. From time t52 to time t54, the sequence control circuit 12 of the overall control circuit 10 outputs the standby signal STBY, which enters the second memory module circuit 40. As a result, the image memory of the second memory module circuit 40 is placed in the standby state from time t52 to time t54.

When time t53 arrives, the second bus-use privilege request signal REQ2 is output by the second memory module circuit 40. When the bus-use privilege acknowledge signal ACK2 is output by the bus arbitration circuit 11 of the overall control circuit 10 and enters the second memory module circuit 40, the reproduced compressed image data enters the second memory module circuit 40 and is subjected to compression processing by the CPU. The compressed image data undergoes decompression in the second memory module circuit 40 from time t54 to time t56. From time t54 to time t56, the standby signal STBY enters the first memory module circuit 30 and the first image memory 39 contained in the first memory module circuit 30 is placed in the standby state.

When time t55 arrives, the image memory of the second memory module circuit 40 is placed in the standby state. The image data that has been written to the first image memory 39 of the first memory module circuit 30 is read out and is input to the playback circuit 22 via the selector 20 of the overall control circuit 10. A playback signal is generated and output by the encoder 24 included in the playback circuit 22. When the image data is being read out of the first memory module circuit 30, the image memory of the second memory module circuit 40 is placed in the standby state.

When reproduction in the first memory module circuit 30 ends, reproduction in the second memory module circuit 40 is carried out. The first memory module circuit 30 is placed in the standby state while reproduction is being performed in the second memory module circuit 40. Thereafter the reproducing operation by the first memory module circuit 30 is performed in alternation with the reproducing operation of the second memory module circuit 40. By inputting the playback signal to the display device (not shown), the image represented by the compressed image data recorded on the memory card 50 is displayed.

With reference to FIG. 7, in which higher priority is given to shortening time needed to start display of the reproduced image than to reduction of power consumption, compressed image data reproduced from the memory card 50 is written to the first image memory 39 of the first memory module circuit 30 from time t62 to time t64. The image memory of the second memory module circuit 40 is placed in the standby state from time t62 to time t64.

When time t64 arrives, the image data that has been written to the image memory 39 of the first memory module circuit 30 is decompressed by the CPU 31. Further, in parallel with the decompression of data in the first memory module circuit 30, the compressed image data reproduced from the memory card 50 is written to the image memory of the second memory module circuit 40.

When time t66 arrives, the compressed image data that has been recorded on the memory card 50 is again written to the image memory 39 of the first memory module circuit 30. In parallel with the writing compressed image data to the image memory 39, the compressed image data is decompressed in the second memory module circuit 40.

Thereafter, the image data that has been written to the image memory 39 is decompressed in the first memory module circuit 30 and, in parallel with this decompressing operating, the compressed image data that has been recorded on the memory card 50 is input to the second memory module circuit 40.

At time t67 the image memory contained in the first memory module circuit 30 is placed in the standby state and data decompression is performed by the CPU of the second memory module circuit 40.

When time t68 arrives, the image data is read out of the first memory module circuit 30 and the playback signal is generated. The second memory module circuit 40 is placed in the standby state during the processing for generating the playback signal.

By virtue of the operation shown in FIG. 7, processing for reproducing image data from the memory card 50 is executed by one memory module circuit in parallel with data decompression executed by the CPU of the other memory module circuit. The time needed to display an image is shortened as a result.

Figure 8A:
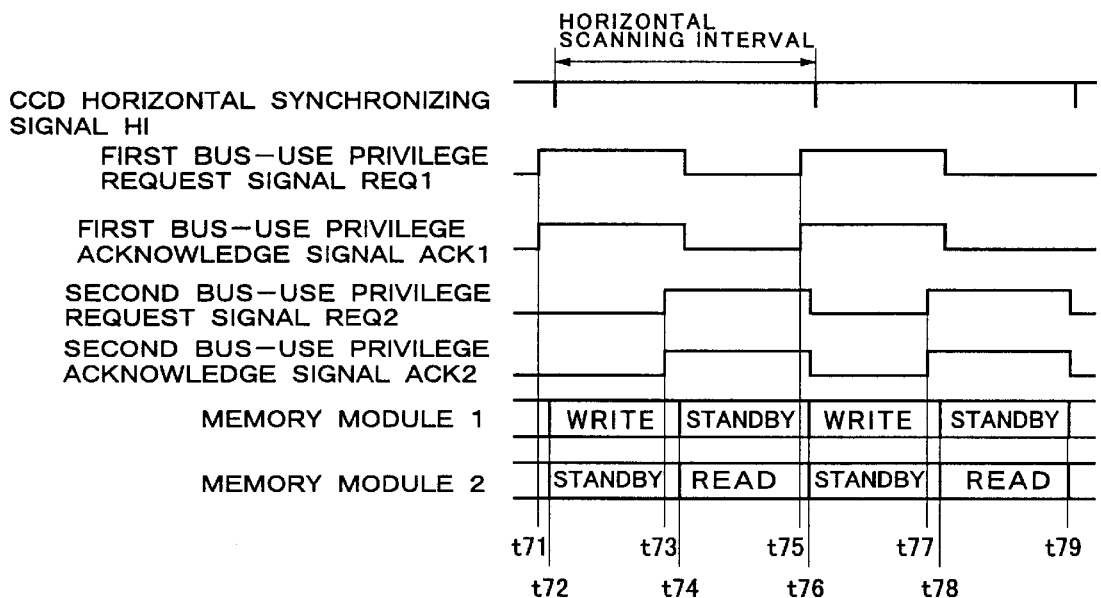
Figure 8B:
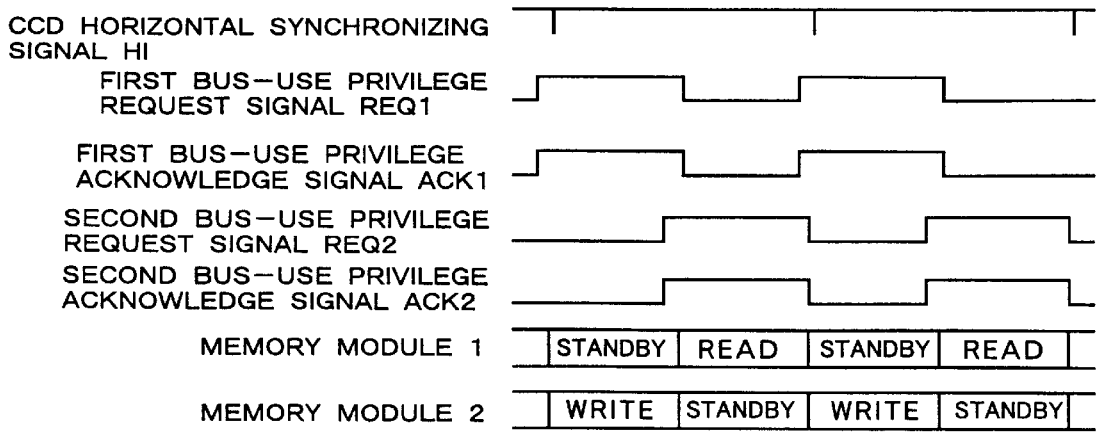

FIGS. 8a and 8b are time charts illustrating signals that flow into each circuit of the digital electronic still-video camera as well as the operating states of memory module circuits at the time of movie operation.

In the movie operation mode, image data that has been compressed along the time axis in the time-axis compression circuit 28 enters a memory module circuit from the overall control circuit 10 as mentioned above. Owing to compression along the time axis, one horizontal scanning interval of image data is written to the image memory 39 of the first memory module circuit 30 in one half of one horizontal scanning interval. (The writing of the data takes place from time t72 to time t74 and from time t76 to time t78 in FIG. 8a.) The image memory of the second memory module circuit 40 is placed in the standby state when image data is being written to the image memory 39.

When the writing of image data to the image memory 39 of the first memory module circuit 30 ends, the time-axis compressed image data that has been written to the image memory of the second memory module circuit 40 is read out and input to the overall control circuit 10. The time-axis compressed image data is restored by the time-axis decompression circuit 29 to image data having the time axis that prevailed at the time of image pick-up and this image data is then output from the playback circuit 22 as the playback signal. The image of the subject is displayed in the form of a movie by applying this playback signal to the display device.

When the writing of the image data to the image memory 39 of the first memory module circuit 30 ends, writing of the image data to the image memory of the second memory module circuit 40 is carried out, as shown in FIG. 8b. In this case also the writing of the image data to the image memory 39 contained in the first memory module circuit 30 and the read-out of image data from the image memory contained in the second memory module circuit are performed in turn. It goes without saying that when image data is being written to one memory module circuit or when image data is being output from one memory module circuit, the image memory of the other memory module circuit is in the standby state.

Figure 9:
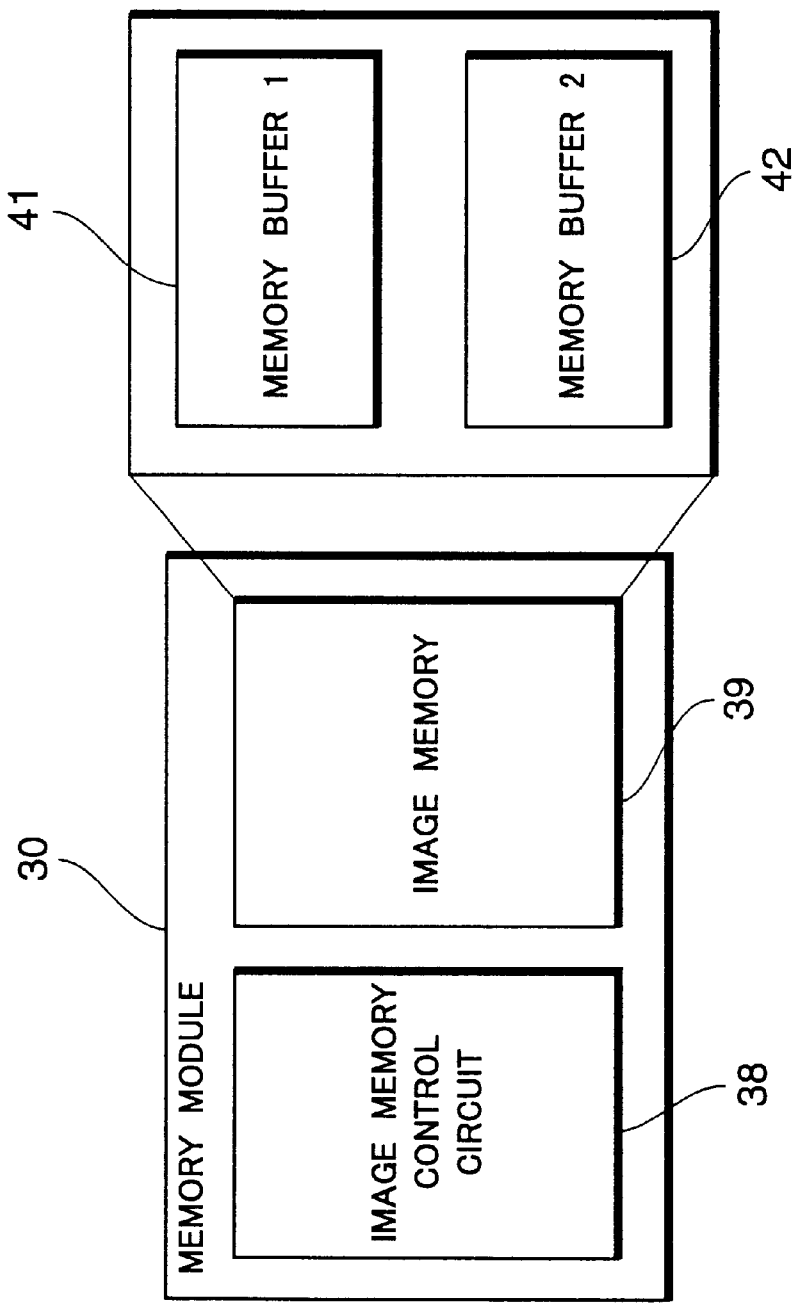
FIG. 9 illustrates the memory space of an image memory.
Figure 10A:
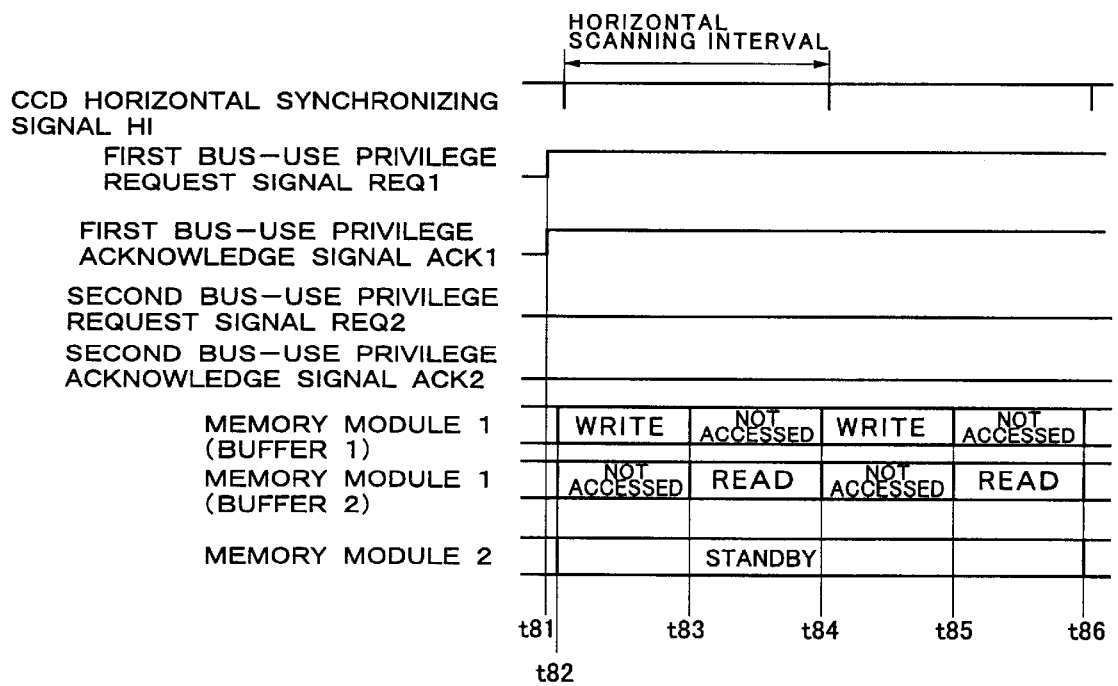
FIGS. 10a and 10b are time charts illustrating signals that flow into each circuit of the digital electronic still-video camera as well as the states of memory module circuits.
Figure 10B:
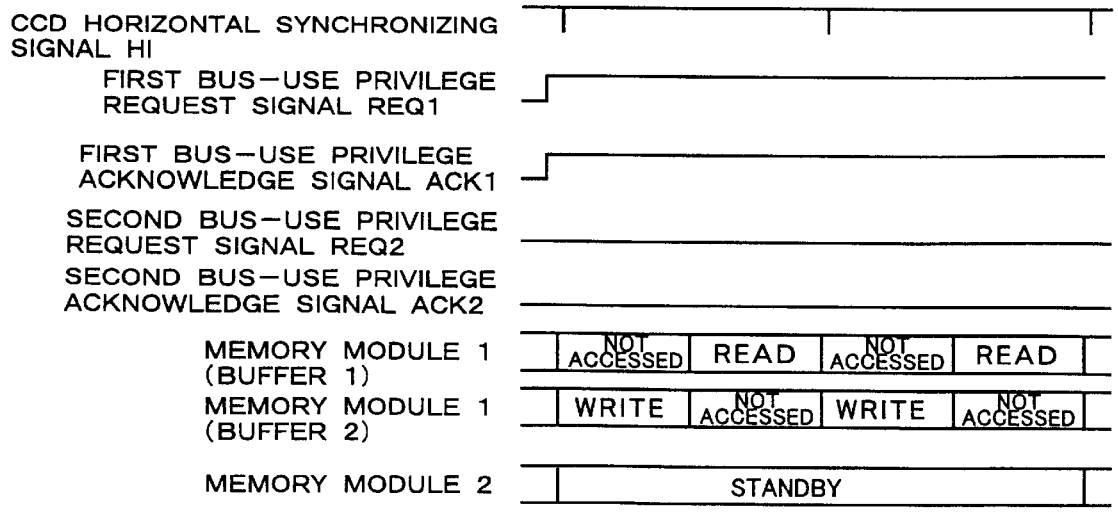

FIG. 9 illustrates the memory space of an image memory, and FIGS. 10a and 10b are time charts illustrating signals that flow into each circuit of the digital electronic still-video camera as well as the states of memory module circuits.

It is assumed in this embodiment that movie operation is performed using the first memory module circuit 30 and that the second memory module circuit 40 is in the standby state.

The image memory 39 of the first memory module circuit 30 is partitioned into two memory buffers 41 and 42.

As shown in FIG. 10a, time-axis compressed image data is written to the first memory buffer 41. While the image data is being written to the first memory buffer 41, the second memory buffer 42 is not accessed (times t82 to t83 and times t84 to t85). When the writing of the image data to the first memory buffer 41 ends, image data that has been written to the second memory buffer 42 is read out and the time axis of the image data is restored by the time-axis decompression circuit 29 to the time axis that prevailed at the time of image pick-up.

As shown in FIG. 10b, time-axis compressed image data is written to the second memory buffer 42. While the image data is being written to the second memory buffer 42, the first memory buffer 41 is not accessed.

Though the memory module circuits 30 and 40 are both provided with CPUs in the foregoing embodiment, the CPUs may be removed from the memory module circuits 30 and 40. In such case the overall control circuit 10 would be provided with a CPU and this CPU would execute the processing for generating luminance data, the processing for generating color difference data and the data compression processing.

Further, two memory module circuits are illustrated in the foregoing embodiment. However, three or more memory module circuits may be provided.

As many apparently widely different embodiments of the present invention can be made without departing from the spirit and scope thereof, it is to be understood that the invention is not limited to the specific embodiments thereof except as defined in the appended claims.

What is claimed is:

1. A digital electronic still-video camera for obtaining image data representing the image of a subject by picking up the image of the subject using image sensing means, processing the obtained image data and recording the processed image data on a recording medium, comprising:
   a plurality of memory modules each of which includes:
      an image memory to and from which data can be written and read for processing, the image memory being different from said recording medium, and
      an image memory control circuit responsive to an applied standby/active control signal for placing said image memory in a standby or active state and controlling said image memory in such a manner that when said image memory has been placed in the active state, image data obtained from the image sensing means is written to said image memory or image data that has been written to said image memory is read out of said image memory; and
   a memory module control circuit for applying the standby/active control signal to said image memory control circuits included in said plurality of memory modules,
   wherein, during an image record operation in which the image data obtained by said image sensing means is compressed and stored on the recording medium in compressed form, the obtained image data is compressed using at least one of the plurality of memory modules including the image memory placed in the active state, and the image data that has been compressed using at least one of the plurality of memory modules is recorded on said recording medium.

2. The camera according to claim 1, wherein said memory module control circuit applies the standby/active control signal to said image memory control circuits in such a manner that when the image memory included in one memory module among the plurality of memory modules is in the active state, the image memory included in at least one memory module among the other memory modules is placed in the standby state.

3. The camera according to claim 1, wherein said plurality of memory modules are freely attachable to and detachable from said image sensing means.

4. The camera according to claim 1, wherein said image sensing means and said plurality of memory modules are connected via a common bus;
   said image memory control circuits included in said plurality of memory modules each output a signal indicative of a bus-use request to said memory module control circuit; and
   said memory module control circuit includes:
      decision means for deciding, on the basis of the bus-use request signals input thereto, the image memory control circuit that is allowed to use the bus; and
      enabling signal output means for outputting a bus-use enabling signal to the image memory control circuit allowed to use the bus by said decision means.

5. The camera according to claim 1, wherein said memory module control circuit selects an image memory, to which image data obtained by the image sensing means is written, in dependence upon the storage capacities of said image memories included in said plurality of memory modules.

6. A method of controlling operation of a digital electronic still-video camera for obtaining image data representing the image of a subject by picking up the image of the subject using image sensing means, processing the obtained image data and recording the processed image data on a recording medium, comprising the steps of:
   providing a plurality of memory modules each of which includes an image memory, which is separate from said recording medium, to and from which image data can be written and read for processing, and an image memory control circuit responsive to an applied standby/active control signal for placing the image memory in a standby or active state and controlling the image memory in such a manner that when the image memory has been placed in the active state, image data obtained from the image sensing means is written to the image memory or image data that has been written to the image memory is read out of the image memory; and
   applying the standby/active control signal to the image memory control circuits included in the plurality of memory modules, wherein
   during an image record operation in which the image data obtained by the image sensing means is compressed and stored on the recording medium in compressed form, the obtained image data is compressed using at least one of the plurality of memory modules including the image memory placed in the active state, and the image data that has been compressed using at least one of the plurality of memory modules is recorded on the recording medium.

7. The apparatus according to claim 1, wherein said memory module control circuit applies the standby/active control signal to said image memory control circuit in response to setting of a reproducing mode and controls said image memory control circuit so as to write image data read from said recording medium to said image memory.

8. The apparatus according to claim 1, wherein said memory module control circuit applies the standby/active control signal to said image memory control circuit so as to cause the corresponding image memory to be repeatedly placed in the standby state and the active state alternately.

9. The camera according to claim 1, wherein, during a playback operation, compressed image data is retrieved from said recording medium and de-compressed using at least one of the plurality of memory modules.

10. The camera according to claim 6, wherein, during a playback operation, compressed image data is retrieved from said recording medium and de-compressed using at least one of the plurality of memory modules.

* * * * *